United States Patent
van Vliet et al.

(10) Patent No.: US 9,744,509 B2
(45) Date of Patent: Aug. 29, 2017

(54) CHEMICAL CARBON DIOXIDE GAS GENERATOR

(75) Inventors: Laurens Daniël van Vliet, Delft (NL); Viola van Pul-Verboom, Delft (NL); Cornelis Anthonius Hubertus Schuurbiers, Delft (NL)

(73) Assignee: Nederlandse Organisatie Voor Toegepast-Natuurwetenschappelijk Onderzoek Tno (NL)

(*) Notice: Subject to any disclaimer, the term of this patent is extended or adjusted under 35 U.S.C. 154(b) by 237 days.

(21) Appl. No.: 13/982,416

(22) PCT Filed: Feb. 7, 2012

(86) PCT No.: PCT/NL2012/050065
§ 371 (c)(1),
(2), (4) Date: Oct. 4, 2013

(87) PCT Pub. No.: WO2012/108764
PCT Pub. Date: Aug. 16, 2012

(65) Prior Publication Data
US 2014/0023579 A1    Jan. 23, 2014

(30) Foreign Application Priority Data

Feb. 7, 2011 (EP) .................................... 11153474

(51) Int. Cl.
*C06B 23/04* (2006.01)
*B01J 7/00* (2006.01)
(Continued)

(52) U.S. Cl.
CPC ................ *B01J 7/00* (2013.01); *C01B 31/20* (2013.01); *C06B 23/04* (2013.01); *C06D 5/06* (2013.01)

(58) Field of Classification Search
CPC . B01J 7/00; C01B 31/20; C06B 23/04; C06D 5/06
See application file for complete search history.

(56) References Cited

U.S. PATENT DOCUMENTS 2,665,972 A * 1/1954 Lewis ....................... B01J 8/30
422/142
3,806,461 A    4/1974 Hendrickson et al.
(Continued)

FOREIGN PATENT DOCUMENTS

GB    1371506    10/1974
JP    5053514    5/1975
(Continued)

OTHER PUBLICATIONS

NL Search Report in corresponding NL Pat. No. 2008244, 5 pages.
Japanese Office Action corresponding to Japanese patent application No. 2013-553387, dated Mar. 7, 2016, 4 pages.

*Primary Examiner* — Richard M Rump
(74) *Attorney, Agent, or Firm* — Tarolli, Sundheim, Covell & Tummino LLP

(57) ABSTRACT

A chemical carbon dioxide gas generator comprising:
  a charge housing;
  a carbon dioxide gas penetrable charge, contained in the said housing, the charge comprising
    a) 40-60 wt. % of a substance which upon decomposition generates carbon dioxide, which substance is selected from the group of magnesium carbonate, other carbonates, magnesium oxalate and other oxalates,
    b) 20-50 wt. % of an oxidiser selected from the group of sodium chlorate, potassium chlorate, lithium chlorate, other metal chlorates, sodium perchlorate, potassium perchlorate, lithium perchlorate, and other metal perchlorates,
(Continued)

c) 1-20 wt. % of carbon or another fuel,
d) 1-10 wt. % binder,
   said components a), b), c) and d) together forming 90-100 wt. % of the total weight of the charge;
an ignition device for igniting the charge;
a carbon dioxide gas treatment unit for reducing the content of one or more side-products—which may have been formed by the charge—in the generated carbon dioxide, and/or for cooling carbon dioxide gas generated by the charge; and
an outlet for carbon dioxide gas generated by the charge.

25 Claims, 1 Drawing Sheet

(51) Int. Cl.
  *C06D 5/06* (2006.01)
  *C01B 31/20* (2006.01)

(56) References Cited

U.S. PATENT DOCUMENTS

| | | |
|---|---|---|
| 3,862,866 A | 1/1975 | Timmerman et al. |
| 3,897,285 A | 7/1975 | Hamilton et al. |
| 3,901,747 A | 8/1975 | Garner |
| 4,097,241 A | 6/1978 | Garner et al. |
| 4,238,253 A | 12/1980 | Garner |
| 2003/0097953 A1* | 5/2003 | Serizawa ................ C06B 31/10 102/531 |

FOREIGN PATENT DOCUMENTS

| | | | |
|---|---|---|---|
| JP | 5152380 | 5/1976 | |
| NL | WO 2009078707 A1 * | 6/2009 | ............ C01B 21/02 |
| RU | 2108282 | 4/1998 | |
| WO | 0119757 | 3/2001 | |
| WO | 0123327 | 4/2001 | |
| WO | 0183404 | 8/2001 | |
| WO | 03009899 | 2/2003 | |
| WO | 2009078707 | 6/2009 | |

\* cited by examiner

CHEMICAL CARBON DIOXIDE GAS GENERATOR

FIELD OF THE INVENTION

The invention relates to applied chemistry, more specifically to a chemical carbon dioxide gas generator, a device comprising a chemical carbon dioxide gas generator, a method for generating carbon dioxide, and to a charge material suitable for generating carbon dioxide gas.

BACKGROUND OF THE INVENTION

Gas generating processes based on the decomposition or burning of chemical propellants are frequently used for a number of purposes, e.g. for the inflation of inflatable devices, such as airbags, life boats or life vests, for operating pneumatically driven devices, or for use in fire-extinguish devices.

Known chemical methods for obtaining relative cool gases are generally based on the decomposition or the burning of solid materials in special units. These materials are generally shaped in the form of a solid block of material or as (loosely) packed powder, loose granules or loose tablets. The hot gases generated from the decomposition of these materials are in general cooled with the aid of special chemical cooling agents or by specific designed features such as heat exchangers. The high temperature burning gases are passed through the layer of the cooling agent or the heat exchanger and the temperature of the gases decreases as a result of the endothermal decomposition process of, or heat absorption by the cooling agent. Such processes are described for instance in GB-A 1,371,506.

In RU 2108282 it is observed that one of the drawbacks of the hitherto known art as cited above is the relatively complicated structure of these units. Another drawback is that the known gas generators did not allow or provide for the gases to be cooled below 150° C., which limits the applicability of such gas generators to systems that can withstand such high temperatures. Further disadvantages include the formation of relatively large quantities of undesired side-products, e.g. carbon monoxide (CO) or nitrogen oxides, a large mass and large size of the generator. For nitrogen gas generators RU 2108282 has the drawback of a reactive slag remaining after usage. This reactive slag requires controlled dismantling of the used gas generator, which make them less suitable for consumer products.

WO 01/23327 proposes a gas generating device for effectively generating nitrogen gas of a low temperature, in order to overcome the above drawbacks.

Accordingly, the gas generator of WO 01/23327 comprises at least one first body, comprising means for the generation of (nitrogen) gas, and at least one second body, comprising means for the generation of a neutralisation agent, wherein means are present for contacting the said neutralisation agent with the said first body, to neutralise the reactive reaction products (slag) from the generation of gas in the said first body, and wherein means are present for operating the generation of a neutralisation agent in the second body at a temporal and/or spatial interval from the generation of gas in the first body.

WO 03/009899 relates to a cool oxygen chemical gas generator, which allows the production of oxygen gas at a temperature below 50° C. Although this generator may serve as an alternative to nitrogen in some applications, the reactivity of oxygen can be disadvantageous or make the generated gas unsuitable for a specific purpose. In general, the gas cannot be used in fire extinguisher applications, and may contribute to oxidation reactions, e.g. corrosion of materials that come in contact with oxygen.

There is a need for an alternative to a gas generator for nitrogen or oxygen cool gas.

It is an object of the invention to provide such an alternative, in particular such alternative that overcomes one or more drawbacks of the gas generators mentioned in the above identified documents.

It is in particular an object to provide a gas generator that is suitable to generate relatively cool gas, comprising no or a relatively low amount of toxic or hazardous components.

It has now been found possible to provide a gas generator suitable to generate relatively cool gas mainly consisting of a different gaseous molecule than nitrogen.

SUMMARY OF THE INVENTION

Accordingly, the present invention is directed to a chemical carbon dioxide gas generator comprising:
 a charge housing;
 a carbon dioxide gas penetrable charge, contained in the said housing, the charge comprising
 a) 40-70 wt. % of a substance which upon decomposition generates carbon dioxide, which substance is selected from the group of magnesium carbonate, other carbonates, magnesium oxalate and other oxalates,
 b) 20-50 wt. % of an oxidiser selected from the group of sodium chlorate, potassium chlorate, lithium chlorate, other metal chlorates, sodium perchlorate, potassium perchlorate, lithium perchlorate, and other metal perchlorates,
 c) 1-20 wt. % of carbon or another fuel,
 d) 1-10 wt. % binder,
 said components a), b), c) and d) together forming 90-100 wt. % of the total weight of the charge;
 an ignition device for igniting the charge;
 a carbon dioxide gas treatment material for reducing the content of one or more side-products—which may have been formed by the charge—in the generated carbon dioxide, and/or for cooling carbon dioxide gas generated by the charge; and
 an outlet for carbon dioxide gas generated by the charge.

The invention further relates to a device comprising a gas generator according to any of the preceding claims, wherein the product is selected from the group of fire-extinguish devices, in particular fire-extinguishers, systems for extinguishing fire in a building; inflatable devices, in particular life-vests, inflatable boats, airbags, inflatable floats; and pneumatically driven devices, in particular pneumatic actuators, pneumatic valves. The design of such as device may be based on a design known per se.

The invention further relates to a charge material suitable for generating carbon dioxide gas, comprising
 a) 40-70 wt. % of a substance which upon decomposition generates carbon dioxide, which substance is selected from the group of magnesium carbonate, other carbonates, magnesium oxalate and other oxalates,
 b) 20-50 wt. % of an oxidiser selected from the group of sodium chlorate, potassium chlorate, lithium chlorate, other metal chlorates, sodium perchlorate, potassium perchlorate, lithium perchlorate, and other metal chlorates,
 c) 1-20 wt. % of carbon or another fuel,
 d) 1-10 wt. % binder,
 said components a), b), c) and d) together forming 90-100 wt. % of the total weight of the charge.

The charge material according to the invention is particularly suitable to form a gas-penetrable charge for a gas generator according to the invention.

Accordingly, the invention further relates to a gas-permeable charge for a chemical carbon dioxide gas generator comprising a charge material according to the invention This charge can be prepared by wet-mixing the charge material or components a) d) for providing the charge material, thereby obtaining a moist charge material; granulating the wet-mixed charge material; compacting the granulated material to obtain a product with a desired porosity; forming the compacted product into a desired shape for the charge, such as a block, and drying the charge. The shaped charge which may in particular be adapted to match the inner of the housing wherein the charge is to be contained.

The invention further relates to a method for generating carbon dioxide, comprising
- providing a gas generator according to the invention;
- decomposing the substance which upon decomposition generates carbon dioxide, thereby forming carbon dioxide gas;
- allowing the carbon dioxide gas to pass through the porous or gas-penetrable charge into the carbon dioxide gas treatment unit and thereafter through the carbon dioxide gas treatment unit; and
- allowing to pass the gas through the outlet.

DETAILED DESCRIPTION OF THE INVENTION

Figure 1:
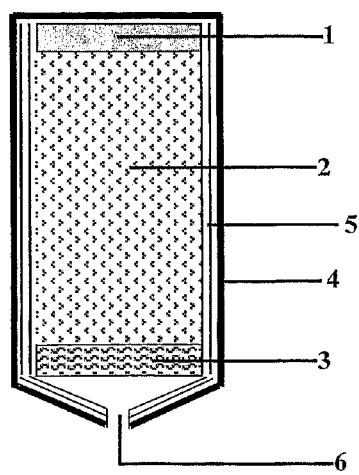
FIG. 1 shows a schematic drawing of a gas generator according to the invention.

The term "or" as used herein means "and/or" unless specified other wise.

The term "a" or "an" as used herein means "at least one" unless specified other wise.

When referring to a 'noun' (e.g. a compound, an additive etc.) in singular, the plural is meant to be included, unless specified otherwise.

It is noted that carbon dioxide generating charges comprising a carbonate, a chlorate and carbon as a fuel have been known for decades. For instance, U.S. Pat. No. 4,097,241, relates to a pyrotechnic composition comprising magnesium carbonate as a coolant, chlorate as oxidiser and carbon fuel. This charge is stated to allow the generation of carbon dioxide with a temperature of about 426.5° C. (col. 10, lines 38-42).

In accordance with the invention it has been found possible to generate carbon dioxide gas at a relatively low temperature; typically the gas leaving the charge already has a relatively low temperature, before an optional further cooling (which may in particular be carried out in a method of the invention wherein the gas leaving the charge is subjected to an exothermal treatment). The gas of a relatively low temperature obtained in accordance with the invention (after leaving the charge or at the outlet) will herein after be referred to as 'cool gas'. This term is used in general for a gas having a temperature of 100° C. or less, in particular for a gas having a temperature of 90° C. or less, preferably of 70° C. or less, more preferably of 50° C. or less. The temperature of the gas at the outlet of the gas generator usually is about ambient temperature or higher, in particular at least 25° C., at least 30° C., or at least 35° C.

In accordance with the invention, a gas is obtainable from the gas generator, which gas comprises $CO_2$ as the most abundant component. In particular, the invention allows providing a gas having a $CO_2$ content of 75-100 mol %, more in particular of at least 80 mol %. In a highly advantageous embodiment, the $CO_2$ content is 85 mol % or more, in particular 90 mol % or more.

In practice, one or more other gaseous components may be present in the gas exiting the gas generator. Thus, the $CO_2$ content may be less than 99 mol %, in particular 95 mol % or less, or 90 mol % or less.

The gas obtained may in particular comprise oxygen, typically in a concentration of 25 mol % or less, in particular of 15 mol % or less, more in particular in a concentration of 5 mol % or less, or 1 mol % or less. The oxygen is thought to be generated from the (per)chlorate, as this is known to be a preferred oxygen releasing chemical (see e.g. WO 03/009899).

The gas obtained may comprise some water e.g. about 5 mol % or less. It is possible though in accordance with the invention to provide a gas with considerably less water, in particular in the range of 0.1 to 1.0 mol %, without needing a specific measure, such as a water adsorbent, to remove water.

Further, it has been found possible to obtain a cool gas that has a low content of toxic or hazardous components, or is essentially free thereof. Thus, the invention may be used to produce gas in a closed space. With essentially free is in particular meant less than 0.05 mol %, more in particular that a compound is not detectible with standard gas detector tubes.

In particular, it is surprising that a gas is obtained that has a low content of CO or is essentially free of CO using a gas generator having a charge based on a carbonate or oxalate and a chlorate or perchlorate. It is the inventors' finding that CO formation can be substantial in such charges, e.g. more than 20 mol %, or more than 50 mol %, thereby exceeding the $CO_2$ production. In accordance with the invention, the cool gas obtained from the generator generally contains substantially more $CO_2$ than CO. The CO concentration preferably is 3 mol % or less, in particular 1 mol % or less, more in particular 0.1 mol % or less. The CO concentration may be 0 (i.e. below the detection limit), although in practice the CO concentration may be about 10 ppmv or more, about 40 ppmv or more, or about 100 ppmv or more.

During their investigations, the inventors further found that when generating a cool gas from a charge composition based on a) a carbonate or oxalate, b) a (per)chlorate, c) a fuel and d) binder, chlorine gas ($Cl_2$) may be formed. This is undesired, as $Cl_2$ is corrosive and may not only impose a health risk, but also may cause corrosion of equipment in contact with the generated gas. In accordance with the invention it is possible to provide a gas, wherein the chlorine gas content is low, or wherein chlorine gas is not traceable. The $Cl_2$ concentration typically is 1 mol % or less, in particular 0.5 mol % or less, more in particular 0.1 mol % or less. The $Cl_2$ concentration may be 0 (i.e. below the detection limit), although in practice the $Cl_2$ concentration may be about 1 ppmv or more, about 10 ppmv or more, or about 100 ppmv or more.

Further, the charge (in a gas generator) according to the invention is advantageous in that the charge is able to decompose exothermally (burn) thereby generating $CO_2$, whilst allowing to pass the generated gas through its own body without substantial destruction of the charge or undesirable volumetric burning. The charge is generally placed in the gas generator in such a way that the oxygen generated in the reaction passes through the porous virgin (undecomposed) part of the charge in the same direction as the reaction front under a pressure difference. Because of this process, the generated gas is cooled down, due to heat exchange with the charge. At the same time, the generated gas heats the charge near the reaction front up to the temperature required to sustain the decomposition reaction.

It is further an advantage of a charge composition (of a gas generator) according to the invention that is has a low toxicity.

The slag formed after the reaction generally is formed by one or more substances with high melting and boiling points and remains within the gas generator.

The preparation of a charge with suitable properties can be based on a manner known per se, e.g. based on methodology as described in WO 03/009899 or WO 01/23327, in combination with the information disclosed herein, common general knowledge and optionally some routine testing.

As indicated above, the charge is penetrable to the gas that is generated. Advantageously, the charge is therefore a structure comprising channels (open pores) through the structure. Such structure may in particular be provided by a granular material, of which the granules are bound together (by the binder). The gas can pass through the interstitial space between the granules, and/or—if the granules are porous—through the pores in the granules. In general, the porosity ($\epsilon_p$) is in the range of 0.2 to 0.75. For good gas streaming properties, a good material strength, and a good $CO_2$ production yield per volumetric unit of material it is preferred that the porosity is in the range of 0.30 to 0.65 In particular, good results have been achieved with a gas penetrable charge having a porosity ($\epsilon_p$) in the range of 0.40 to 0.60. Herein, $\epsilon_p$ is defined as: 1−(the charge density ($\rho_{ch}$) divided by the maximum theoretic composition density ($\rho_c$)), Advantageously, the charge has a compression strength of 2 MPa or more, in particular of 2 to 5 MPa. The compression strength can be measured by placing a grain of the material, in a press and to determine at which force it breaks (grain characteristics: round cylindrical, diameter 44 mm, 60 mm length, force applied at base, perpendicular thereto).

The substance which upon decomposition generates carbon dioxide (a), may in particular be selected from the group of alkaline earth metal and alkali metals, preferably calcium carbonate, calcium oxalate, magnesium carbonate or magnesium oxalate.

From a theoretical carbon dioxide yield point of view, an as high as possible fraction of the charge of substance '(a)' is desirable. On the other hand care should be taken that the decomposition reaction is sustained, during use. Good results have in particular been achieved with magnesium carbonate.

The fraction of the substance which upon decomposition generates carbon dioxide in the charge preferably is at least 45 wt. %, in particular at least 50 wt. %, more in particular at least 53 wt. %, based on the weight of the charge. In particular for a carbonate (magnesium carbonate), it has been found possible to achieve good results also at a fraction of more than 55 wt. %, more in particular of more than 58 wt. % based on the weight of the charge.

For an advantageous decomposition rate it is usually preferred to provide the substance which upon decomposition generates carbon dioxide (a) in the charge at a fraction of 65 wt. % or less, in particular of 62% % or less. In a particularly preferred embodiment, the fraction of the substance which upon decomposition generates carbon dioxide in the charge is about 60 wt. % or less based on the weight of the charge, such as in the range of 40-60 wt. %. In a specific embodiment, said fraction is 58 wt. % or less, particular 55 wt. % or less.

The fraction of the (per)chlorate (b) in the charge, preferably is at least 25 wt. %, in particular at least 30 wt. %, based on the weight of the charge. In particular, said fraction may be 44 wt. % or less, more in particular 40 wt. % or less.

As an alternative to carbon, the fuel (c) may in particular be selected from Al, Ti, Mn, Fe, Mo, Ni, Mg, Co, Zn and Cu.

The fraction of the fuel, preferably carbon, in the charge, preferably is at least 2 wt. %, in particular at least 3 wt. %, more in particular at least 4 wt. %, based on the weight of the charge. If carbon, aluminium or titanium provide the fuel, the fraction preferably is 9 wt. % or less. In particular, said fraction may be 8 wt. % or less, more in particular 7 wt. % or less. In particular for Mn, Fe, Mo, Ni, Mg, Co, Zn or Cu as a fuel, the fraction may advantageously be more than 10 wt. %.

As a binder (d), in principle any inorganic or organic binder may be used that is suitable to bind the other components, to form a gas penetrable charge. Evidently, the binder is a substance different from the substance which upon decomposition generates carbon dioxide (a), the oxidiser (b) and the fuel (c).

Examples of organic binders include polytetrazole, polymer resins, nitrocellulose, and phenolic resins. Organic binders or silicone polymers may decompose, thereby forming a substantial amount of water vapour. The presence of water vapour in a relatively high concentration is undesired since water may condense inside or outside the gas generator, and/or may contribute to corrosion, especially since some carbon dioxide may be dissolved in the condensed water thereby forming an acidic liquid. The inorganic binder may in particular be selected from the group of water glass (alkali metal silicates), mineral clays and zeolites. These binders are in particular suitable to provide a gas penetrable charge for use in a generator according to the invention, wherein the charge has sufficient strength and integrity before and during use to be operated also in an embodiment wherein a reaction front passes through the charge (see also description of FIG. 1, below). A specific advantage of an inorganic binder such as water glass (alkali metal silicates), mineral clay, or a zeolite is its inertness, in that the binder is generally not decomposed thereby forming water when the charge is ignited. Preferred are potassium water glass ($K_2SiO_3$) and sodium water glass ($Na_2SiO_3$), in particular potassium water glass.

The fraction of the binder, preferably inorganic binder, in the charge, preferably is at least 3 wt. %, in particular at least 4 wt. %, more in particular at least 5 wt. %, based on the weight of the charge. In particular, said fraction may be 9 wt. % or less, 8 wt. % or less, or 7 wt. % or less.

In a preferred embodiment, the charge material (of a gas generator) according to the invention, comprises a) magnesium carbonate, the b) sodium chlorate and c) carbon. In a particularly preferred embodiment, the charge material (of a gas generator) according to the invention, comprises a) magnesium carbonate, b) sodium chlorate, c) carbon and d) potassium water glass.

In addition to said components a), b), c) and d), the charge may comprise one or more additional components (additives). The total fraction of additives typically is up to 10 wt. %, in particular up to 5 wt. %. of the total weight of the charge.

One or more additives in the charge may in particular be selected from the group of burn rate modifiers, catalysts for catalysing the generation of carbon dioxide and chlorine scavengers.

The burn rate modifier may in particular be a burn rate catalyst, such as $MnO_2$, $CuO$, $NiO$, $CoOx$, $Co_3O_4$, $Fe_2O_3$, $Na_2O$, $Na_2O_2$, $KO_2$, $MgFea_t$, $KMnO_4$.

A catalyst for catalysing the generation of carbon dioxide in the charge may in particular be selected from the group of catalysts capable of catalysing the conversion of C into $CO_2$ or the conversion of CO into $CO_2$, such as a manganese dioxide/copper oxide catalyst (hopcalite).

The chlorine scavenger in the charge may be a catalyst capable of catalysing the conversion of chlorine, e.g. into chloride or a compound reacting with chlorine, e.g. thereby forming chloride. Examples thereof include $BaO_2$, $SiO_2$, $CoO$, $Co_3O_4$, $Li_2O$, $Li_2O_2$, $MgO$, $CaO$, $MnO_2$; $LiAlO_2$, metal borates, ($LiBO_2$, $Li_2B_4O_7$), metal phosphates (i.e. $Li_3PO_4$), metal acuminates.

The housing of a gas generator according to the invention comprises a carbon dioxide gas treatment unit. Typically, the gas treatment unit is present between the charge and the outlet, such that the generated gas passes through the gas treatment material. The gas treatment unit may comprise one or more different gas treatment materials. If a plurality of gas treatment materials is present, these can be provided in a single layer or a plurality of layers (usually positioned in series, relative to the general direction of the gas flow, when the generator is used).

The gas treatment unit may in particular comprise a gas treatment material may selected from the group of chlorine adsorbents, water adsorbents, materials capable of converting CO or catalysing the conversion of carbon monoxide to carbon dioxide, particle filters and coolants.

As a coolant, an endothermal decomposing material may be provided or an inert material. An inert coolant material preferably has a low thermal conductivity and a high heat capacity. Preferred inert coolant materials are therefore, silicates (such as sand) and materials having a similar or higher heat capacity and/or a similar or lower thermal conductivity. Further, alumina, ceramic materials or metal may in particular be used as a coolant material. If present, the mass of the cooling agent is typically 1-30% of the mass of the charge, preferably less than 20%, more preferably less than 10%. An inert coolant, such as sand or another granular material, also serves as a filter for avoiding (small) particles which may be released from the charge or another gas treatment material.

In a specific embodiment it is placed close to the outlet (not only down stream of the charge but also of the other gas treatment unit(s) (layer(s)), if present.

In an advantageous embodiment, a unit for cooling the generated gas is positioned upstream of at least one further gas treatment unit, in particular it may be positioned as the treatment unit closest to the charge. Thus the gas may be cooled before entering, e.g. a unit for removing CO or $Cl_2$, thereby improving the removal efficacy.

In a further advantageous embodiment, at least two cooling units are provided, with at least one different gas treatment unit positioned in between. This may for instance be advantageous in case the gas treatment unit positioned in between may cause an increase in the gas temperature, in particular due to an exothermic nature of a process taking place in that unit, e.g. CO or $Cl_2$ removal by an exothermic process.

The endothermal decomposing material, as a coolant, preferably provides carbon dioxide gas upon decomposition. Metal carbonates or oxalates, such as calcium or magnesium carbonate or oxalate are capable of decomposing in an endothermic reaction, thereby forming carbon dioxide and cooling down the gas. Thus, such material may be used not only in the charge but also in a layer downstream of the charge. As will be clear to the skilled person, such material in a separate gas treatment unit does not form part of the charge itself.

The chlorine adsorbent may in particular be selected from the group of activated carbon (e.g. ABEK), alkali (earth) metal peroxides and superoxides.

The water adsorbent may in particular be selected from the group of silica gel, zeolites, calcium chloride, aluminium oxide, barium oxide, calcium oxide, calcium sulphate, cupric sulphate, magnesium oxide, magnesium sulphate, phosphorous pentoxide, potassium carbonate, potassium hydroxide, sodium sulphate, zinc chloride.

The material capable of catalysing the conversion of CO in $CO_2$ may in particular be a manganese dioxide/copper oxide catalyst (hopcalite), e.g. carulite.

The design of the gas generator may be based on known gas generators, in particular known cool gas generators, e.g. as described in WO 03/009899 or GB-A 1,371,506.

FIG. 1 shows a schematic representation of a gas generator according to the invention. It shows the igniter (1), e.g. a percussion cap or an electrical igniter, optionally in combination with a booster charge, the porous gas generating charge (2), the carbon dioxide gas treatment unit (3) (which may be formed of a plurality of different materials, not shown); the housing (4), an (optional) thermal protection (5); and the outlet (6).

Upon ignition by the igniter 1, the self-sustaining decomposition (combustion) of the charge, 2, is initiated. The reaction starts on the charge surface adjacent to the igniter and the reaction front runs through the charge body to the opposite end in direction to the outlet 6.

Under the pressure difference the carbon dioxide generated as a result of the reaction passes through the body of the virgin charge, is cooled there and passes through outlet, 6. The outlet may be provided with a conduit to lead the gas to a storage bottle or a device wherein use is to be made of the gas.

In a preferred embodiment, the housing is protected from the heat of the decomposing charge by a thermal protection 5, preferably made from silica or glass fibre impregnated with the same or a different binder as used for the charge 2. In further preferred embodiment, the charge 2 itself provides the thermal protection of the housing. In this case a layer of, generally about 1.5 mm thickness adjacent to the wall of the housing does not burn due to cooling of the outside of the charge by the wall of the housing, 4.

In a preferred embodiment, the housing, 4, is made of metal such as steel, aluminium or titanium. In another preferred embodiment, the housing, 4, is made of a composite material (plastic composite).

Between the charge 2, and the outlet 6, a gas treatment unit 3, is present.

The treatment unit can comprise a plurality of sub-units (layers), as has been described in more detail above.

The housing, 4, in a preferred embodiment has handles or grips for easy transportation. In another preferred embodiment, the housing, 4, has attachment fixtures, which provide easy mounting of the gas generator in different devices. Such fixtures encompass threaded ends, flanges, screw connections or other standard connections that are known in the field.

Figure 2:
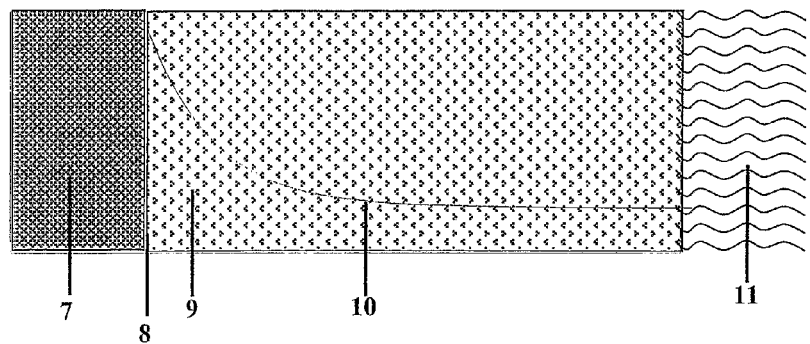
FIG. 2 shows a schematic drawing of a burning charge.

FIG. 2 is a schematic of the charge during quasi steady state burning. At the left, there is a decomposed part of the charge, 7, (slag).

The decomposition front, 8, moves from left to right. The calculated theoretical equilibrium decomposition temperature does not exceed 1500 K, and preferably is in the range of 800 to 1200K. The released carbon dioxide, 11, passes through the virgin porous charge, 9, under the pressure difference, thereby raising the temperature, 10, of the virgin charge and reducing the carbon dioxide gas temperature. At a short distance behind the decomposition front (usually about 2 mm to about 2 cm), the temperature drops to a value close to the initial charge temperature. The carbon dioxide flow leaves the charge at the right-hand side. The temperature profile, 10, as a function of distance of the charge length is shown schematically. Further cooling of the gas generated in the charge generally occurs in the gas treatment unit downstream of the charge (not shown in FIG. 2).

The invention will now be illustrated by the following examples:

EXAMPLES

Charges consisting of magnesium carbonate, oxidiser, fuel and binder were made as follows: after weighing the dry powders have been extensively mixed. The water soluted binder was added with the right amount of moisture and again were extensively mixed in order to obtain a homogenised mixture. The mixture was than granulated over a sieve and put in a mould and compressed in several steps to the required overall porosity. The moulds with the wet porous charges were dried in an oven according to an optimized drying profile in a temperature range between ambient and 150° C. Afterward the charges were taken out of the moulds and visually inspected.

In the following table, compositions are given of the tested charges, as well as the used gas treatment units (in the gas generator, downstream of the charge). The total weight for the charges was about 100 g.

| Ex # | MgCO$_3$ wt. % | NaClO$_3$ wt. % | fuel (C) wt. % | K$_2$SiO$_3$ wt. % | other charge components | gas treatment unit |
|---|---|---|---|---|---|---|
| 1 | 53 | 35 | 5 | 7 | — | 146 g sand* |
| 2 | 54 | 35 | 4 | 7 | — | 146 g sand |
| 3 | 54 | 35 | 4 | 7 | — | 31 g CaCl$_2$, 8 g ABEK, 35 g carulite |
| 4 | 53 | 35 | 5 | 7 | — | 74 g sand 8 g ABEK 35 g carulite |
| 5 | 58 | 30 | 5 | 7 | — | 146 g sand |
| 6 | 61 | 27 | 5 | 7 | — | 146 g sand |

*remark: when only sand is used, the amount used is not optimized. The amount used was the amount needed to fill the empty space in the test setup.

The charges in the gas generator were ignited with a heated resistance wire, gas temperature at the outlet of the generator was measured, and the generated gas was collected in a bag for later analysis.

The chlorine, carbon monoxide, carbon dioxide, water and oxygen content was determined using gas detector tubes and Gas Chromatography.

The results are shown in the following table

| ex # | CO$_2$ vol % | CO vol % | O$_2$ vol % | H$_2$O vol % | Cl$_2$ ppm | Maximum temperature at outlet (° C.) |
|---|---|---|---|---|---|---|
| 1 | 83 | 3.0 | 14 | 0.3 | 400 | 36 |
| 2 | 80 | 1.2 | 18 | 1.4 | 350 | 89* |
| 3 | 82 | below detection limit | 18 | 0.3 | below detection limit | 73 |
| 4 | 85 | 0.04 | 15 | 0.3 | below detection limit | 119** |
| 5 | >60*** | 0.101 | 13 | n.d. | n.d. | 34 |
| 6 | >60*** | 1.4 | 17.5 | n.d. | n.d. | 30 |

*Gas generator before experiment conditioned at 73° C.
**Test used to pressurize a closed volume, so temperature in this case is including compression effects
***Gas detector tubes used for which 60 vol % is maximum that can be quantitatively determined. Taking into account the CO and O$_2$ concentration, it is contemplated that the CO$_2$ concentration probably is higher than 80 vol. %.
n.d. = not determined

The invention claimed is:
1. A chemical carbon dioxide gas generator comprising:
  a charge housing;
  a carbon dioxide gas penetrable charge, contained in the said housing, the charge comprising:
    a) 40-70 wt. % of a substance which upon decomposition generates carbon dioxide, which substance is selected from the group of magnesium carbonate, calcium carbonate, magnesium oxalate and calcium oxalate,
    b) 20-44 wt. % of an oxidiser selected from the group of sodium chlorate, potassium chlorate, lithium chlorate, other metal chlorates, sodium perchlorate, potassium perchlorate, lithium perchlorate, and other metal perchlorates,
    c) 1-5 wt. % of carbon, the charge further comprising
    d) 1-10 wt. % inorganic binder, which inorganic binder is selected from the group consisting of water glass, mineral clays and zeolites;
    said components a), b), c) and d) together forming 90-100 wt. % of the total weight of the charge;
  an ignition device for igniting the charge;
  a carbon dioxide gas treatment unit for reducing the content of one or more side-products—which may have been formed by the charge—in the generated carbon dioxide, and/or for cooling carbon dioxide gas generated by the charge; and
  an outlet for carbon dioxide gas generated by the charge;
  wherein the carbon dioxide gas passing the outlet comprises at least 80 mol % carbon dioxide and 1 mol % or less CO.
2. A chemical carbon dioxide gas generator according to claim 1, wherein the water glass is potassium water glass.
3. A chemical carbon dioxide gas generator according to claim 1, wherein the carbon dioxide gas treatment unit comprises at least one material selected from the group of chlorine adsorbents, water adsorbents, and materials capable of converting or catalysing the conversion of carbon monoxide to carbon dioxide.
4. A chemical carbon dioxide gas generator according to claim 1, wherein the charge comprises one or more additives selected from the group of burn rate modifiers, catalysts for catalysing the generation of carbon dioxide and chlorine scavengers, in a total concentration of up to 10 wt. %.
5. A chemical carbon dioxide gas generator according to claim 1, wherein the concentration of the substance which upon decomposition generates carbon dioxide is in the range of 45-65 wt. %.

6. A chemical carbon dioxide gas generator according to claim 1, wherein the concentration of the oxidiser is in the range of 25-44 wt. %.

7. A chemical carbon dioxide gas generator according to claim 1, wherein the concentration of the inorganic binder is in the range of 3-9 wt. %.

8. A chemical carbon dioxide gas generator according to claim 1, wherein the substance which upon decomposition generates carbon dioxide is magnesium carbonate, and the oxidiser is sodium chlorate.

9. A chemical carbon dioxide gas generator according to claim 1, wherein the charge is a structure comprising channels through the structure, which structure is provided by a granular material, of which the granules are bound together by the inorganic binder.

10. A chemical carbon dioxide gas generator according to claim 1 wherein the charge has a porosity ($\epsilon_p$), defined as:
1-(the charge density ($\rho_{ch}$) divided by the maximum theoretic composition density ($\rho_c$)),
in the range of 0.30 to 0.65.

11. A chemical carbon dioxide gas generator according to claim 1, wherein:
the concentration of the substance which upon decomposition generates carbon dioxide is in the range of 50-60 wt. %;
the concentration of the oxidiser is in the range of 30-40 wt. %;
the concentration of the binder is in the range of 4-8 wt. %.

12. A chemical carbon dioxide gas generator according to claim 10, wherein the porosity ($\epsilon_p$) is in the range of 0.40 to 0.60.

13. A chemical carbon dioxide gas generator according to claim 1, wherein the gas generator generates a carbon dioxide gas having a temperature of 70° C. or less at the outlet of the gas generator, after igniting the charge by the ignition device.

14. A chemical carbon dioxide gas generator according to claim 13, wherein the gas generator generates a carbon dioxide gas having a temperature of 50° C. or less at the outlet, after igniting the charge by the ignition device.

15. A device comprising a gas generator according to claim 1, wherein the device is selected from the group of fire-extinguish devices, systems for extinguishing fire in a building, inflatable devices, and pneumatically driven devices.

16. A device according to claim 15, wherein the device is a fire-extinguish device.

17. A device according to claim 15, wherein the device is a pneumatically driven device.

18. A method for generating carbon dioxide, comprising providing a gas generator, comprising
a charge housing;
a carbon dioxide gas penetrable charge, contained in said charge housing, the charge comprising
a) 40-70% wt. % of a substance which upon decomposition generates carbon dioxide, which substance is selected from the group of magnesium carbonate, calcium carbonate, magnesium oxalate and calcium oxalate,
b) 20-44 wt. % of an oxidiser selected from the group of sodium chlorate, potassium chlorate, lithium chlorate, other metal chlorates, sodium perchlorate, potassium perchlorate, lithium perchlorate, and other metal perchlorates,
c) 1-5 wt. % of carbon, the charge further comprising
d) 1-10 wt. % inorganic binder, which inorganic binder is selected from the group consisting of water glass, mineral clays and zeolites;
said components a), b), c) and d) together forming 90-100 wt. % of the total weight of the charge;
an ignition device for igniting the charge;
a carbon dioxide gas treatment unit for reducing the content of one or more side-products—which may have been formed by the charge—in the generated carbon dioxide, and/or for cooling carbon dioxide gas generated by the charge; and
an outlet for carbon dioxide gas generated by the charge;
decomposing the substance which upon decomposition generates carbon dioxide, thereby forming carbon dioxide gas;
allowing the carbon dioxide gas to pass through the charge into the carbon dioxide gas treatment unit and thereafter through the carbon dioxide gas treatment unit; and
allowing to pass the gas through the outlet;
wherein the carbon dioxide gas passing the outlet comprises at least 80 mol % carbon dioxide and 1 mol % or less CO.

19. Method according to claim 18, wherein the gas is allowed to the pass through the outlet at a temperature of 100° C. or less.

20. Method according to claim 18, wherein the carbon dioxide gas passing the outlet comprises at least 80 mol % carbon dioxide, less than 0.1 mol % chlorine, less than 0.1 mol % CO, and less than 1 mol % water.

21. Method according to claim 18, wherein the carbon dioxide gas is passed through the charge by a pressure difference between the outlet and the inner of the housing wherein the charge is present, said pressure difference being generated by the gas formed by the decomposition.

22. Method according to claim 20, wherein the carbon dioxide gas comprises at least 80 mol % carbon dioxide, less than 0.1 ppmv chlorine, less than 25 ppmv CO, and less than 0.1 mol % water.

23. A method according to claim 20, wherein the gas comprises 15 mol % or less oxygen.

24. A charge material suitable for generating carbon dioxide gas, the charge material comprising:
a) 40-70 wt. % of a substance which upon decomposition generates carbon dioxide, which substance is selected from the group of magnesium carbonate, calcium carbonate, magnesium oxalate and calcium oxalate,
b) 20-44 wt. % of an oxidiser selected from the group of sodium chlorate, potassium chlorate, lithium chlorate, other metal chlorates, sodium perchlorate, potassium perchlorate, lithium perchlorate, and other metal perchlorates,
c) 1-5 wt. % of carbon,
d) 1-10 wt. % inorganic binder, which inorganic binder is selected from the group consisting of water glass, mineral clays and zeolites;
said components a), b), c) and d) together forming 90-100 wt. % of the total weight of the charge; and which charge produces a carbon dioxide gas containing at least 80 mol % carbon dioxide and 1 mol % or less CO upon decomposition.

25. A gas-permeable charge for a chemical carbon dioxide gas generator comprising a charge material according to claim 24.

* * * * *